United States Patent [19]
Petruccello et al.

[11] Patent Number: 5,699,697
[45] Date of Patent: Dec. 23, 1997

[54] SLOTTED SWIVEL TUBE

[75] Inventors: John P. Petruccello, Detroit; Michael Reasoner, Ortonville, both of Mich.

[73] Assignee: Teleflex Incorporated, Plymouth Meeting, Pa.

[21] Appl. No.: 723,890

[22] Filed: Oct. 1, 1996

[51] Int. Cl.$^6$ ............................................. F16C 1/22
[52] U.S. Cl. ......................... 74/502.6; 74/502.4; 403/328
[58] Field of Search ........................ 74/502.4, 502.6, 74/502; 403/329, 355, 318, 354, 328; 29/444.1

[56] References Cited

U.S. PATENT DOCUMENTS

| | | |
|---|---|---|
| 1,590,724 | 6/1926 | Caretta . |
| 2,880,435 | 4/1959 | Deutsch et al. ............... 403/355 |
| 4,348,348 | 9/1982 | Bennett et al. . |
| 4,649,010 | 3/1987 | Bennett et al. ............... 29/444.1 |
| 4,887,929 | 12/1989 | Hale ............................. 403/328 |
| 4,889,006 | 12/1989 | Kolonske et al. ............ 74/502.4 |
| 4,902,162 | 2/1990 | Watt ............................. 403/355 |
| 5,347,882 | 9/1994 | Klotz ........................ 74/502.6 X |
| 5,531,134 | 7/1996 | Petruccello ................. 74/502.4 |
| 5,575,180 | 11/1996 | Simon ......................... 74/502.4 |
| 5,632,182 | 5/1997 | Reasoner ..................... 74/502.4 |

*Primary Examiner*—Vinh T. Luong
*Attorney, Agent, or Firm*—Howard & Howard

[57] ABSTRACT

A motion transmitting assembly (10) for transmitting motion in a curved path by a core element (12) is movably supported in a conduit (14) which is, in turn, supported by a ferrule (16). A slotted swivel tube (24) is supported by the ferrule (16) and a terminal (24) is slidably disposed in the swivel tube (24). The assembly is characterized by the terminal (28) having a cross pin bore (30) and a cross pin (32) disposed in the cross pin bore (30), the cross pin (32) having a hole (34) extending transversely or diametrically therethrough with the core element (12) extending through the hole (34) to retain the cross pin (32) in the bore (30). The cross pin (32) extends through the cross pin bore (30) and out of each of the slots (26). A crimped section (36) of the terminal (28) is deformed into gripping engagement with the core element (12) to retain the terminal (28) to the core element (12).

4 Claims, 2 Drawing Sheets

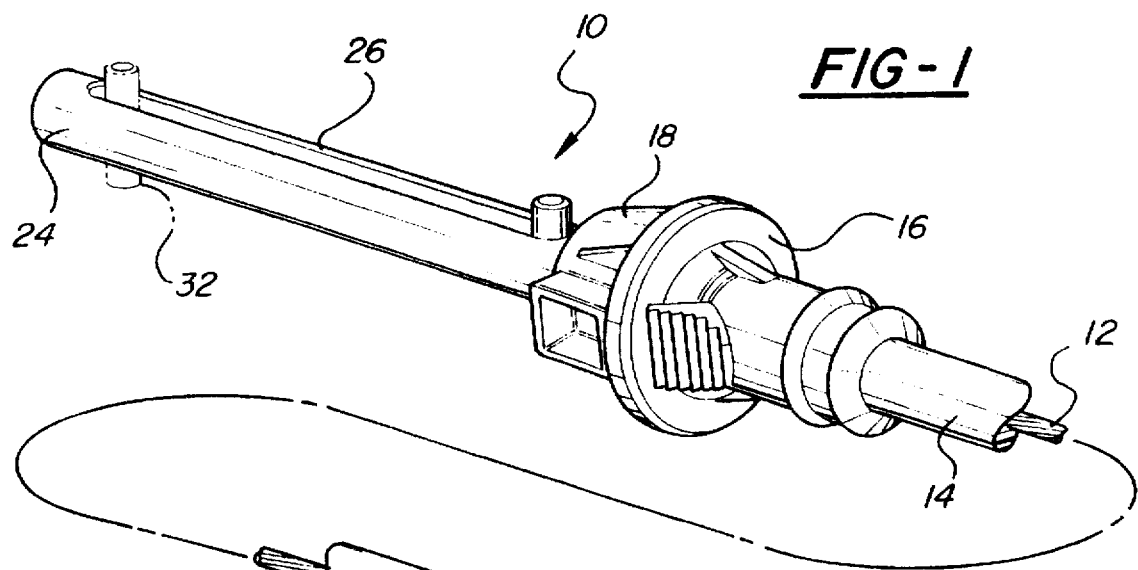
FIG-1
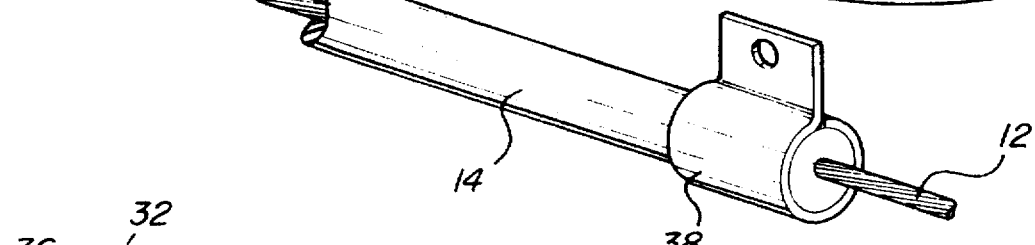
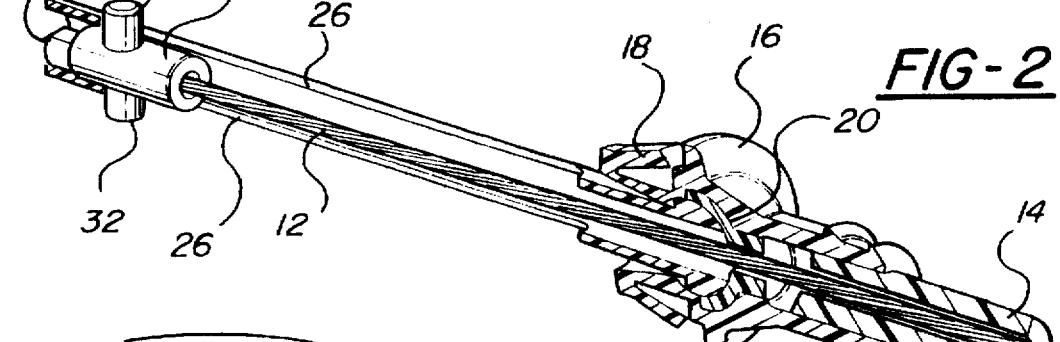
FIG-2
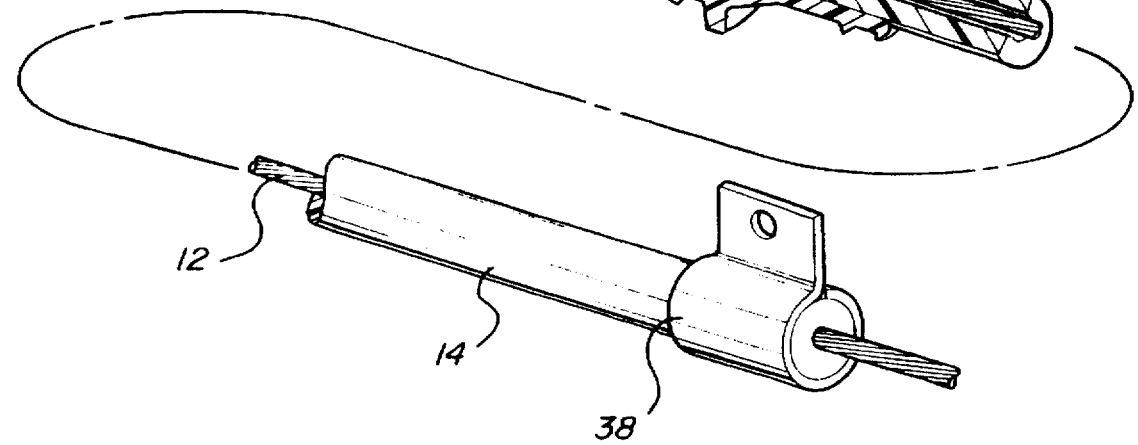

5,699,697

1
SLOTTED SWIVEL TUBE

TECHNICAL FIELD

This invention relates to a motion-transmitting remote control assembly of the type for transmitting motion along a curved path by a flexible motion-transmitting core element. More specifically, the invention relates to the terminal for interconnecting the core element to a member to be controlled.

BACKGROUND OF THE INVENTION

Sometimes such remote control assemblies include a tube extending from the support ferrule at one end of the conduit with a rod slidably supported in the tube, the rod being adapted to be connected to a member to be controlled. Frequently, the tube has a swivel connection to the ferrule so that it may swivel in an arc. One such assembly is shown in U.S. Pat. No. 4,348,348 granted Sep. 7, 1982 to Bennett et al and assigned to the assignee of the subject invention. Sometimes, however, the space restraints will not permit the full extension of the rod form the swivel tube. There remains a need for the full action of the terminal to remain within the length of the swivel tube. An example of such an assembly is shown in U.S. Pat. No. 1,590,724 granted Jun. 29, 1926 to Caretta; however, that assembly is not easily or economically fabricated.

SUMMARY OF THE INVENTION AND ADVANTAGES

A motion transmitting remote control assembly for transmitting motion in a curved path comprising a core element for transmitting forces along a curved path, a conduit for movably supporting the core element, and a ferrule for supporting the conduit on support structure, a tube extending from the ferrule. The tube defines at least one slot extending along the tube and a terminal is slidably disposed in the tube. The assembly is characterized by the terminal having a cross pin bore, a cross pin disposed in the cross pin bore and having a hole extending transversely therethrough with the core element extending through the hole to retain the cross pin in the bore. A retainer means prevents the core element from being withdrawn from the terminal.

The invention also encompasses the method of fabricating the assembly comprising the steps of: inserting a cross pin in a cross pin bore extending through the terminal, inserting the core element through a hole in the cross pin to retain the cross pin in the bore in the terminal, and preventing the core element from being withdrawn from the terminal.

Accordingly, the subject invention provides swivel tube remote control assembly wherein the actuation occurs within the length of the swivel tube but which is easily and economically assembled.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a fragmentary perspective view of a remote control assembly utilizing the subject invention;

FIG. 2 is a perspective view like FIG. 1 but cut-away and partially in cross section.

Figure 3:
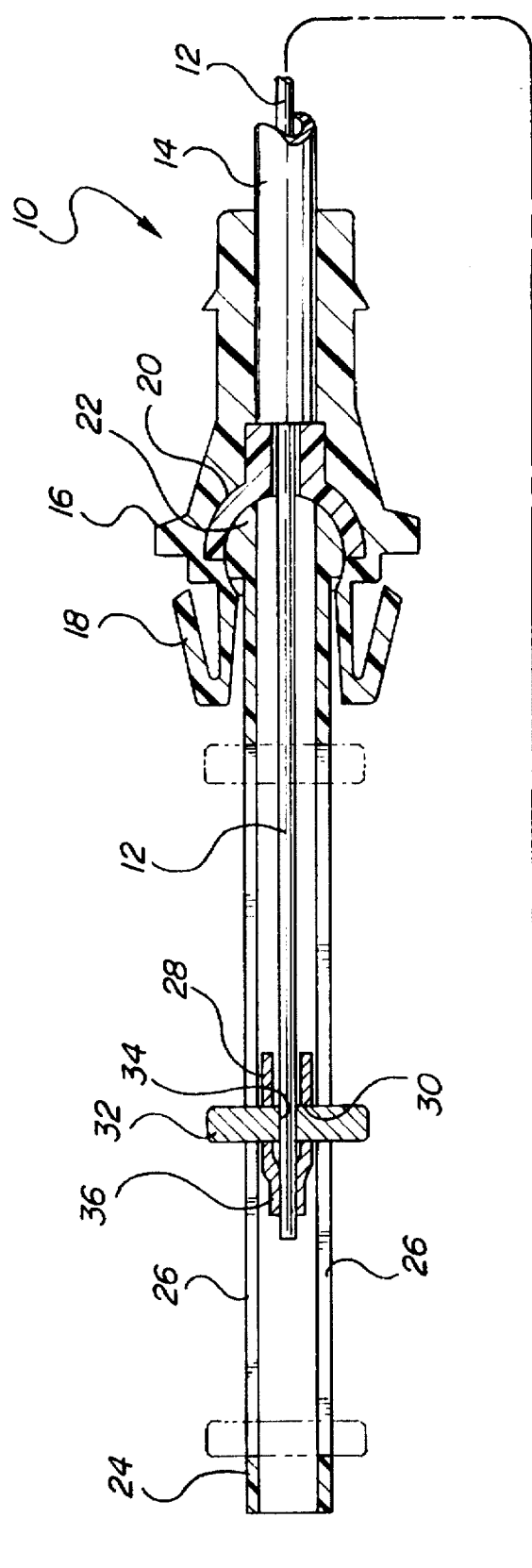
FIG. 3 is a side view partially cut-away and in cross section.
Figure 3:
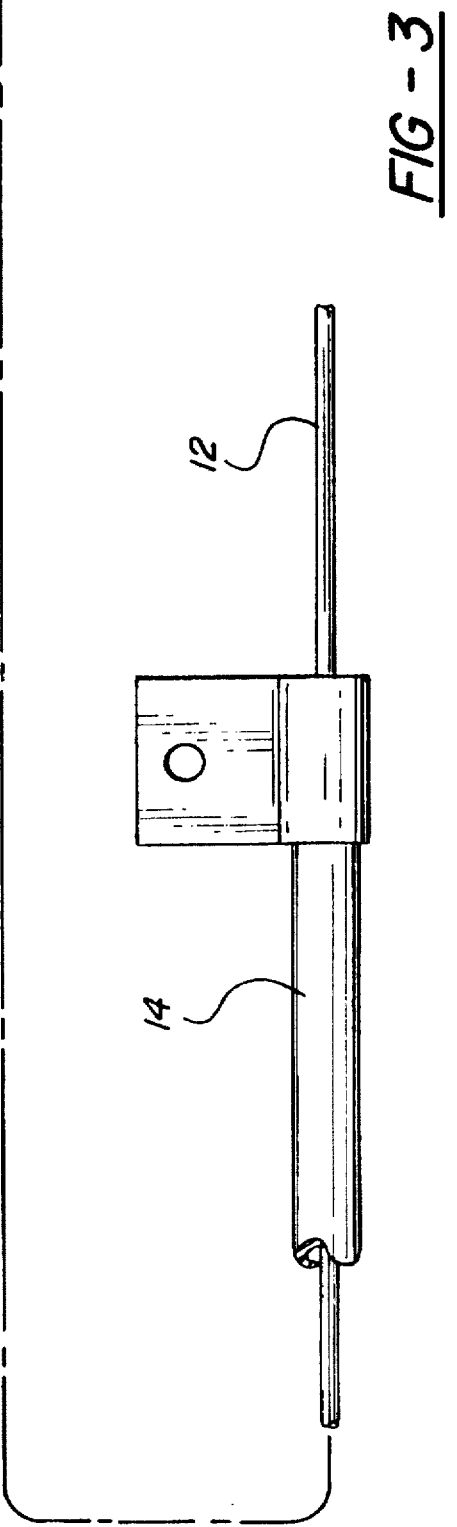

2
DETAILED DESCRIPTION OF THE PREFERRED EMBODIMENT

Referring to the Figures, wherein like numerals indicate like or corresponding parts throughout the several views, a motion transmitting remote control assembly for transmitting motion in a curved path is generally shown at 10.

The assembly 10 comprises a core element 12 for transmitting forces along a curved path. The core element 12 is either a solid metal wire or made up of stranded wire filaments. A conduit 14 movably supports the core element 12. The conduit 14 comprises an inner plastic tube surrounded by wires or filaments spiraled helically about the inner tube on a long lead and encased in an extruded plastic casing. A ferrule 16 supports the conduit 14 on a support structure, such as a bulkhead in a vehicle body. More specifically, the ferrule 16 includes attachment arms 18 for retaining the female 16 in an aperture in a bulkhead or bracket, as is well known in the art. The ferrule 16 is molded of plastic about the conduit 14 so as to be intimately bonded thereto.

In accordance with the teachings in the aforesaid U.S. Pat. No. 4,348,348, the ferrule 16 is also molded about a female insert 20 and the spherical end 22 of a swivel tube 24 extending from the ferrule 16. Accordingly, the swivel tube 24 can swivel or pivot about the center of the spherical end 22 to various angles relative to the axis of the ferrule 16 and the conduit 14. In addition, the swivel tube 24 can rotate about the axis of the ferrule 16 and the conduit 14.

The swivel tube 24 defines a pair of oppositely or diametrically opposed slots 26 extending along the swivel tube 24. A terminal 28 is slidably disposed in the swivel tube 24.

The assembly is characterized by the terminal 28 having a cross pin bore 30 and a cross pin 32 disposed in the cross pin bore 30. The cross pin 32 has a hole 34 extending transversely or diametrically therethrough. The core element 12 extends through the hole 34 to retain the cross pin 32 in the bore 30. The cross pin 32 extends through the cross pin bore 30 and out of each of the slots 26.

A retainer means prevents the core element 12 from being withdrawn from the terminal 28. The retaining means comprises a crimped section 36 of the terminal 28 deformed into gripping engagement with the core element 12.

A fitting 38 is disposed on the other end of the conduit for attachment to the support structure, such as a vehicle body.

The invention also includes the method of fabricating a motion transmitting remote control assembly 10 for transmitting motion in a curved path by a core element 12 movably supported in a conduit 14 with a ferrule 16 for supporting the conduit 14 on support structure and a slotted tube 24 extending from the ferrule 16 and a terminal 28 slidably disposed in the tube 24 wherein the method comprises the steps of:

1) inserting a cross pin 32 in a cross pin bore 30 extending through the terminal 28, 2) inserting the core element 12 through a hole 34 in the cross pin 32 to retain the cross pin 32 in the bore 30 in the terminal 28, and 3) preventing the core element 12 from being withdrawn from the terminal 28.

The last step may be further defined as preventing the core element 12 from being withdrawn by deforming a section 36 of the terminal 28 into gripping engagement with the core element 12. This may be accomplished in one of two ways with an appropriate squeezing tool. First, the section 36 of the terminal 28 may be deformed by crimping as the section 36 extends exteriorly of the tube 24. In other words, as the cross pin 32 abuts the outward end of the slots 26, the end of the terminal 28 extends sufficiently from the end of the tube 24 to be gripped, squeezed, crimped or swaged along the section 36. Alternatively, the deforming of the section 36 of the terminal 28 may be accomplished by inserting the deforming tool through the opposed slots 26 in the terminal 28.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) for transmitting motion in a curved path, said assembly comprising:

a core element (12) for transmitting forces, a conduit (14) for movably supporting said core element (12), a ferrule (16) for supporting said conduit (14), a tube (24) extending from said ferrule (16), said tube (24) defining at least one slot (26) extending along said tube (24), a terminal (28) slidably disposed in said tube (24), said terminal (28) having a cross pin bore (30), a cross pin (32) disposed in said cross pin bore (30) and having a hole (34) extending transversely therethrough, said core element (12) extending through said hole (34) to retain said cross pin (32) in said bore (30), and retainer means (36) for preventing said core element (12) from being withdrawn from said terminal (28).

2. An assembly as set forth in claim 1 wherein said tube (24) is supported by said ferrule (16) for swivelling and rotational movement relative thereto.

3. An assembly as set forth in claim 2 wherein said retaining means (36) comprises a crimped section of said terminal (28) deformed into gripping engagement with said core element (12).

4. An assembly as set forth in claim 3 wherein said tube (24) includes a pair of said slots (26) diametrically opposed to one another, said cross pin (32) extending through said cross pin bore (30) and out of each of said slots (26).

* * * * *